United States Patent
Mumick et al.

(10) Patent No.: US 7,254,227 B2
(45) Date of Patent: Aug. 7, 2007

(54) SIGNAL-BASED SESSION MANAGEMENT FOR TELEPHONIC APPLICATIONS

(76) Inventors: Inderpal Singh Mumick, 85 Swenson Cir., Berkeley Heights, NJ (US) 07922; Sandeep Sibal, 228 County Club La., Scotch Plains, NJ (US) 07076

( * ) Notice: Subject to any disclaimer, the term of this patent is extended or adjusted under 35 U.S.C. 154(b) by 0 days.

(21) Appl. No.: 10/260,144

(22) Filed: Sep. 30, 2002

(65) Prior Publication Data
US 2003/0152202 A1 Aug. 14, 2003

Related U.S. Application Data

(60) Provisional application No. 60/326,260, filed on Oct. 1, 2001.

(51) Int. Cl.
*H04M 3/42* (2006.01)
(52) U.S. Cl. .............. 379/215.01; 379/88.18; 379/265.01; 455/458; 455/556.1
(58) Field of Classification Search ........... 455/556.1, 455/556.2, 557, 458; 704/235, 271; 379/215.01, 379/88.18, 93.08, 93.17, 93.27, 210.02, 230, 379/265.01, 115.01, 220.01, 229
See application file for complete search history.

(56) References Cited

U.S. PATENT DOCUMENTS

| | | | |
|---|---|---|---|
| 4,645,874 A | 2/1987 | Fildes | 379/93 |
| 5,031,206 A * | 7/1991 | Riskin | 379/93.27 |
| 5,493,609 A * | 2/1996 | Winseck et al. | 379/93.08 |
| 6,055,306 A * | 4/2000 | Lozinski et al. | 379/230 |
| 6,327,363 B1 * | 12/2001 | Henderson et al. | 379/265.01 |
| 6,549,619 B1 * | 4/2003 | Bell et al. | 379/210.02 |
| 6,563,916 B1 * | 5/2003 | Deutsch et al. | 379/215.01 |
| 6,701,162 B1 * | 3/2004 | Everett | 455/556.1 |
| 7,023,971 B1 * | 4/2006 | Huart et al. | 379/88.18 |
| 2002/0076032 A1 * | 6/2002 | Rodriguez et al. | |

* cited by examiner

*Primary Examiner*—Gerald Gauthier
(74) *Attorney, Agent, or Firm*—Ash Tankha of Counsel, Lipton Weinberger & Husick

(57) ABSTRACT

A technique for allowing an automated participant in a telephone conversation, such as an Interactive Voice Response (IVR) system or a voice browser, to react to the placing of the conversation "on hold." When a conversation between an automated participant and a human participant is placed on hold, a signal is provided to the automated participant indicating that the voice circuit between the two participants has been broken. In response to the signal, the automated participant may take appropriate action, such as suspending its participation in the conversation, extending the time for which it awaits a response from the human participant, continuing the conversation in a "visual" mode using the keypad and display on the human participant's handset, or some other appropriate action.

10 Claims, 2 Drawing Sheets

SIGNAL-BASED SESSION MANAGEMENT FOR TELEPHONIC APPLICATIONS

CROSS-REFERENCE TO RELATED APPLICATION

This application claims the benefit of U.S. Provisional Application No. 60/326,260, entitled "Signal-Based Session Management for Telephonic Applications," filed Oct. 1, 2001.

FIELD OF THE INVENTION

The present invention relates generally to the field of telephony. More particularly, the invention relates to applications that interact with a user through a remotely-located voice terminal, and provides a technique whereby the application may respond to status changes that affect the voice circuit through which the user and the application interact. In one example, the invention provides a technique whereby an application that interacts remotely with a telephone user via a voice circuit can respond to a signal that indicates that the voice circuit has been put "on hold."

BACKGROUND OF THE INVENTION

As computer technology becomes more widely available, it is increasingly the case that a telephone call is made not between two people, but between a person and a machine. In the past, the only way for a person to transact business by telephone was to place a call and speak to another person. Today, however, it is possible for a person to place a call and transact much business by speaking to a machine. An Interactive Voice Menu (IVR) system is one well-known means whereby a user can interact with a machine using a telephone. More recently, voice browsers that facilitate telephonic interaction with rich content such as Voice eXtensible Markup Language (VXML) have been developed. When IVR systems or VXML browsers are employed, the IVR system or VXML browser essentially becomes a party to a telephone conversation.

One issue that arises when a party to a conversation is a machine (e.g., the machine that executes the IVR system or VXML browser) is that the machine may not be aware of the entire array of events that can affect the conversation, or how to respond to those events meaningfully. A case in point is where a user who uses an IVR system or VXML browser places the conversation "on hold" (e.g., by using a "hold" button on the user's telephone, by responding to a call-waiting signal, etc.). If the conversation were taking place between two human beings, the parties would both understand from context that "hold" means they must suspend their conversation and resume when the conversation has been taken off "hold." However, an IVR system or VXML browser may not be adapted to recognize that the conversation is on hold; nor may such a system be adapted to respond to the "hold" in a meaningful way, such as by suspending the conversation until the hold is released.

In view of the foregoing, there is a need for a technique that overcomes the drawbacks of the prior art.

SUMMARY OF THE INVENTION

The present invention provides a system and method whereby a non-human (i.e., machine) party to a conversation carried over a voice circuit may respond to the fact that the voice circuit has been placed on hold. For example, a user may be interacting with an application (e.g., an IVR system for a bank or airline, or a voice browser that renders web content provided in VXML, etc.) by way of a voice circuit, and the voice circuit may be put on hold during the conversation. In a typical telephone network, the placing of the voice circuit on hold generates a signal. The application may receive the signal and take appropriate action. For example, if the application is in the middle of rendering a voice menu, it may pause the rendering until the voice circuit is no longer on hold. If the application is waiting for a user response with a pre-determined timeout, the timeout may be tolled during the time that the circuit is on hold. As another example, the application may switch to a non-voice mode of interaction with the user—e.g., by rendering a menu as data on the user's handset.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention provides a system and method whereby an application that interacts with a user through a telephone can respond in a meaningful way to the conversation's being placed on hold. For example, if the application interacts with the user through a voice menu, an indication that the voice circuit between the user and the application has been broken may cause the rendering of the voice menu to pause, may cause the application to change to a data interactive mode, or may cause the application to take some other action to respond to the breaking of the voice circuit.

Figure 1:
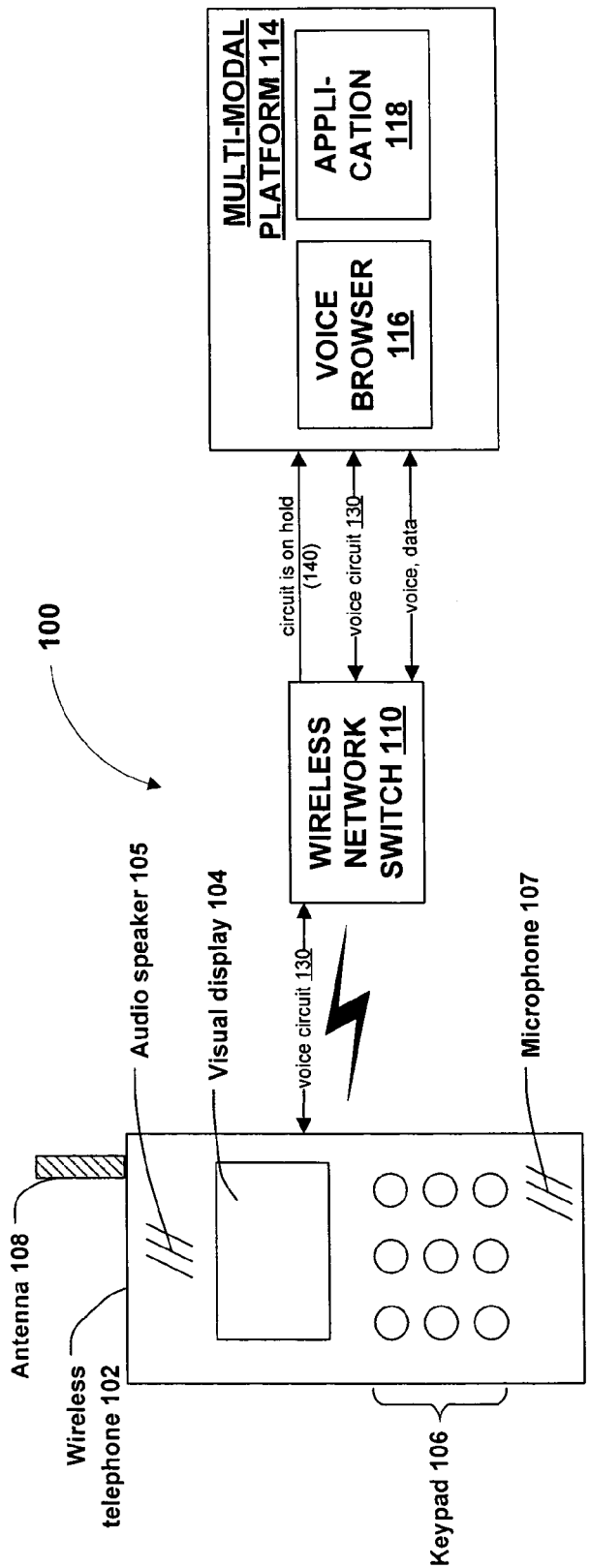
FIG. 1 is a block diagram of a first telephone network architecture in which aspects of the invention may be implemented.

FIG. 1 shows a telephone network architecture 100. Architecture 100 includes a wireless telephone 102, a wireless network switch 110, and a multi-modal platform 114. While architecture 100 is shown, for exemplary purposes only, in the context of wireless telephony, it will be appreciated that the invention applies to any type of telephony or communications architecture including (but not limited to) wired telephony.

In a preferred embodiment, wireless telephone 102 comprises a visual display 104, an audio speaker 105, a keypad 106, a microphone 107, and an antenna 108. Visual display 104 may, for example, be a Liquid Crystal Display (LCD) which displays text and graphics. Audio speaker 105 renders audio signals (e.g., signals received from other components in architecture 100) in order to produce audible sound. Keypad 106 may be an alpha-numeric keypad that allows a user to input alpha-numeric characters. Depending upon context, wireless telephone 102 may respond to input from keypad 106 by displaying appropriate characters on display 104, transmitting ASCII representations of such characters, or (in the case of numeric input) generating appropriate Dual Tone Multi-Frequency (DTMF) signals. Microphone 107 captures audio signals, which may, in one example, be digitally sampled by wireless telephone 102 for wireless transmission to other components of network architecture 100. Antenna 108 is used by wireless telephone 102 to transmit information to, and receive information from, components within architecture 100. For example, wireless telephone 102 may use antenna 108 to receive digital audio signals for rendering on speaker 105, to transmit digital audio signals captured by microphone 107, to receive data to be displayed on visual display 104, or to transmit data captured by keypad 106. Wireless telephone 102 may also contain computing components (not shown). For example, wireless telephone 102 may have a memory and a processor, which may be used to store and execute software (e.g., software that digitally samples audio signals captured with microphone 107, software that generates analog audio signals from digitally-sampled audio received through antenna 108, software that enables the browsing of content using visual display 104 and keypad 106, etc.). The structure of a wireless telephone 102 that employs the components shown in FIG. 1 in connection with a memory and processor will be apparent to those of skill in the art, and thus is not discussed at length herein.

One feature of wireless telephone 102 is that it can be viewed as having two different "modes" of communication. On the one hand, wireless telephone 102 communicates in a "voice" mode; on the other hand, wireless telephone 102 communicates in a "visual" mode. In voice mode, wireless telephone uses microphone 107 to capture audio (which may be digitally sampled and then transmitted through antenna 108), and uses speaker 105 to render audio (which may be received through antenna 108 in a digital form). "Voice" mode is exemplified by the conventional usage of a telephone in which a first party uses the telephone to engage in two-way speech with another party. In "visual" mode, wireless telephone uses keypad 106 to capture data (e.g., alpha-numeric data which may be represented in ASCII form), and uses visual display 104 to render data. The captured data may be transmitted through antenna 108, and antenna 108 may also be used to receive the data that is to be displayed on visual display 104.

Wireless telephone 102 communicates with a wireless network switch 110. Wireless network switch is coupled to a tower (not shown) that engages in two-way communication with wireless telephone 102 through antenna 108. Wireless network switch 110 connects wireless telephone 102 to various components, such as multi-modal platform 114.

In accordance with aspects of the invention, multi-modal platform 114 may facilitate communication with wireless telephone 102 in two "modes" (i.e., in voice mode and visual mode). For example, multi-modal platform 114 may be adapted to send audio information to and receive audio information from wireless telephone 102 through switch 110 using voice circuit 130. Multi-modal platform 114 may likewise be adapted to send visual data to and receive visual data from wireless telephone 102 through switch 110 using a data channel. Multi-modal platform 114 may be adapted to change between these two "modes" of communications according to instructions or existing conditions. The data channel is not typically characterized as a "circuit"; in contrast to voice circuit 130 which represents dedicated bandwidth between wireless telephone 102 and multi-modal platform 114, the data channel is simply a path between wireless telephone 102 and multi-modal platform 114 for which data transmission can always be queued, but for which, in general, no bandwidth has been dedicated or reserved.

Multi-modal platform 114 may be embodied as a computing device that is equipped with components that are typical for such a device. For example, multi-modal platform may have a memory, a processor, fixed and removable storage devices, communications ports, etc. Multi-modal platform 114 may be capable of executing software. In the example of FIG. 1, multi-modal platform 114 executes voice browser 116 and application 118. Application 118 is a software application that engages in an interactive session with a user of wireless telephone 102. For example, application 118 may be an airline reservation system that allows a user to make reservation, check the status of arriving and departing flights, etc. Voice browser 116 provides the interface whereby a user interacts in a voice-oriented manner with the content that application 118 provides. It should be understood that there is a conceptual difference between application 118 on the one hand, which generates content and responds to user input, and voice browser 116, which acts as a voice interface between the user of wireless telephone 102 and application 116. Application 118 generates and responds to content in a manner that is, in some sense, agnostic to whether the user will interact with that content in voice mode, visual mode, or some other mode. For example, application 118 may employ menus, and may store versions of those menus in both VXML format, as well as Wireless Markup Language (WML) format; in this case, application 118 either provides the VXML version of the menu to voice browser 116 if the user is in voice mode, or provides the WML version of the menu to wireless telephone 102 if the user is in visual mode. Although voice browser 116 and application 118 are conceptually distinct and are shown as separate components, it should be understood that their respective functionality may be merged into a single component.

In one example, a user of wireless telephone 102 uses application 118 by requesting the creation of voice circuit 130 between wireless telephone 102 and multi-modal platform 114. For example, the user of wireless telephone 102 may simply dial the directory number of multi-modal platform 114, thereby causing the telephone network to terminate a voice call to multi-modal platform 114. At some point during the call, voice circuit 130 may be broken. For example, the user of wireless telephone 102 may place the call on hold, or may respond to a "call-waiting" signal, or perform some other action that causes voice circuit 130 to be broken. (It should be noted that the breaking of voice circuit 130 need not be initiated by the user of wireless telephone 102, but rather may by initiated for any reason without departing from the spirit and scope of the invention.) Upon the breaking of voice circuit 130, a signal 140 is generated which indicates that the voice circuit has been broken. Signal 140 is received by multi-modal platform 114 and/or application 118. In response to the receipt of signal 140, application 118 takes appropriate action. The following is a non-exhaustive list of appropriate actions that may be taken in response to the breaking of the voice circuit:

If the application is in the process of rendering audio (e.g., a voice menu, a response to a user-initiated action, etc.), the application may suspend rendering the audio until the voice circuit is reinstated.

If the application is in the process of waiting for user input pending a timeout, the application may extend the timeout until the voice circuit is reinstated.

If the application is capable of multi-modal interaction and is presently interacting in voice mode, it may switch to visual mode (or to some other mode). For example, if the application is in the process of providing a user with a menu in the form of voice and the voice circuit is broken, the application may then use the "visual" mode to render the menu, and may wait for input in the form of data (e.g., data entered through the keypad on wireless telephone 102.)

It should be understood that the deployment of the invention in a multi-modal environment, as described above in connection with FIG. 1, is merely exemplary. In another example, application 118 does not execute on a multi-modal platform, but is merely an application with a voice interface (e.g., an IVR menu system). It will be understood that the invention can be used to allow such an application to respond to the breaking of voice circuit 130 in a meaningful way—e.g., by suspending the rendering of voice output. An IVR menu system (or other application with a voice interface) may respond to the breaking of a voice circuit in accordance with the invention, whether or not the application is capable of "multi-modal" interaction.

Figure 2:
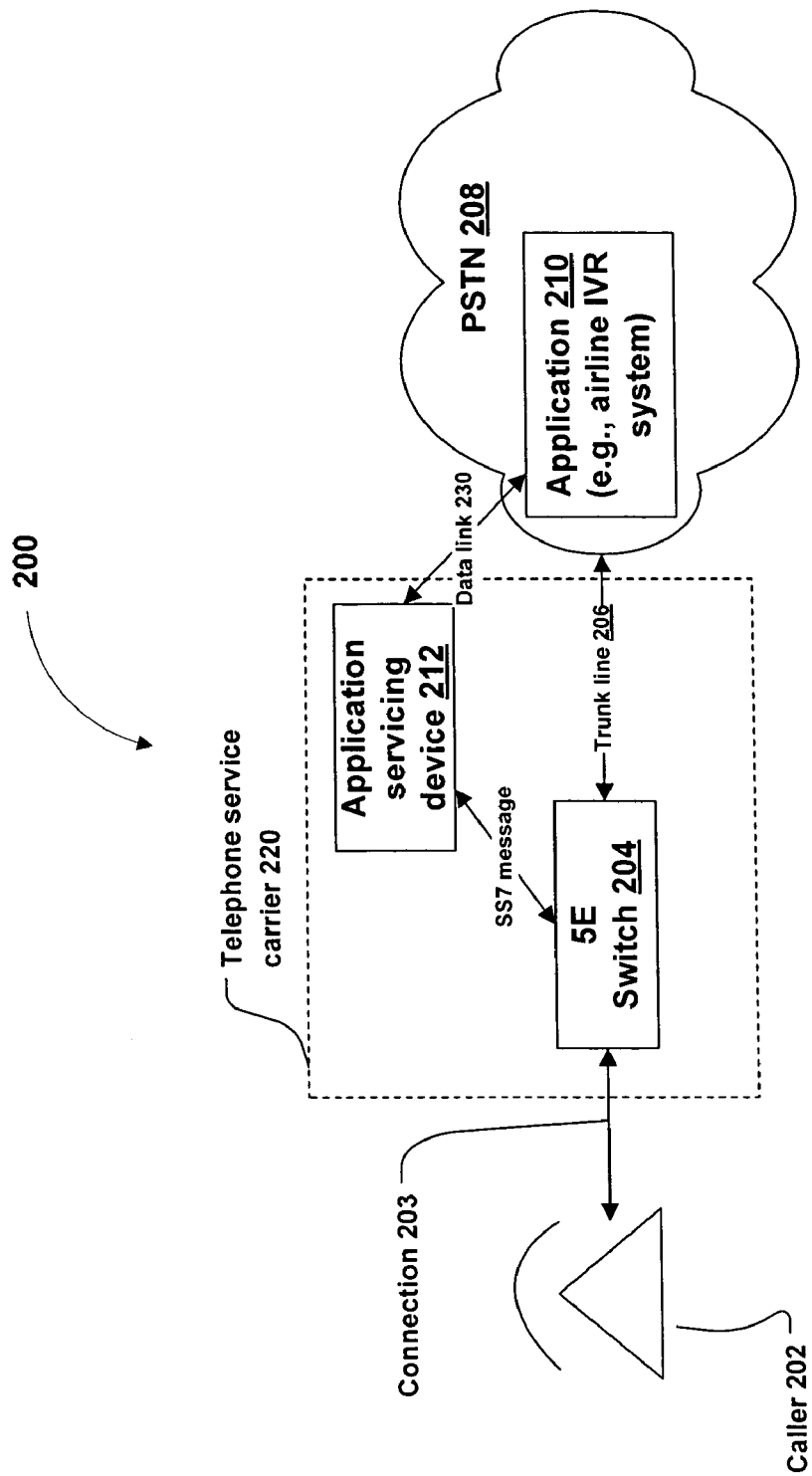
FIG. 2 is a block diagram of a second telephone network architecture in which aspects of the invention may be implemented.

Additionally, it should be understood that, while FIG. 1 depicts deployment of the invention in the context of wireless telephony, the invention may also be used in the context of wired telephony. FIG. 2 depicts an embodiment of the invention in the context of wired telephony architecture 200.

In architecture 200, caller 202 participated in a wired telephone network through a connection 203 to a telephone switch 204, which is depicted in FIG. 2 by the non-limiting example of a 5E switch. Telephone switch 204 connects caller 202 to Public Switched Telephone Network (PSTN) 208 via trunk line 206. One participant in PSTN 208 may be a computing device that executed an application 210 that participates in a conversation with caller 202. In FIG. 2, such an application is depicted by the non-limiting example of an airline IVR system.

Telephone switch 204 is operated by a telephone service carrier, and communicates with other components operated by the telephone service carrier through a Signaling System 7 (SS7) network. The SS7 network, which is known in the art, carries a set of messages between a telephone service carrier's various components in order to facilitate interaction and cooperative behavior between the components. One example of a message in an SS7 network is a message indicating that a particular voice circuit has been broken. In general, SS7 messages are available only within the sphere of components operated by a given telephone service carrier, where this sphere is depicted in FIG. 2 by dashed line 220. In other words, SS7 messages are not generally available to parties located on PSTN 208, or otherwise outside of the telephone service carrier. Thus, if a conversation between caller 202 and application 210 is placed on hold, telephone switch 204 will be aware that the voice circuit between caller 202 and application 210 has been broken and will generate an SS7 message so-indicating, but application 210 will have no way to receive the SS7 message or take action based on the message.

One way to permit application 210 to receive the message is to place an application servicing device 212 at the telephone service carrier (i.e., within dashed line 220), such that application servicing device 212 can receive SS7 messages. When application servicing device 212 receives an SS7 message indicating that a voice circuit between application 210 and caller 202 has been broken, it can pass that message to application 210 using data link 230 (which may, for example, be a public network such as the Internet, a private network, or a dedicated connection). Upon receiving indication from application servicing device 212 that the voice circuit has been broken, application 210 can respond as described above in connection with FIG. 1.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of communicating between an application and a caller who are connected by way of a voice circuit in a telecommunications network, wherein the application directly or indirectly delivers audio information to the caller by way of the voice circuit and receives audio information from the caller by way of the voice circuit, the method comprising:
   receiving an indication that the voice circuit has been placed on hold by the caller;
   taking at least one action by the application in response to said indication, without ending a call between the application and the caller;
   wherein said application is in a state of waiting for audio information from the caller pending a time-out, and wherein said action comprises extending said timeout; and
   wherein said caller communicates with said application by way of a telecommunications device that comprises a speaker, which renders audio information received by way of the voice circuit, a microphone which captures audio for transmission over the voice circuit, and a visual display, wherein said action comprises:
   suspending delivery of audio information to the caller; and
   delivering data renderable on said visual display which corresponds to the audio information whose delivery has been suspended.

2. The method of claim 1, further comprising:
   maintaining a state of the application during the time that the voice circuit is on hold.

3. A system for communicating between an interactive application and
   a user device, wherein said interactive application is an application that engages in an interactive session with said user device, said system comprising:
   a multimodal platform hosting said interactive application, wherein said multimodal platform;
      enables communication in a plurality of modes between the interactive application and the user device, and wherein the interactive application can switch between the modes;
      receives an indication from the user device that communication between the user device and interactive application has been put on hold;

maintains a state of the interactive application during the time that the communication in the first mode is put on hold;

extends the timeout of the connection between the user device and the interactive application while said communication has been put on hold; and wherein said user device is in communication with the multimodal platform and engages in an interactive session with the interactive application.

4. The system of claim 3, wherein a voice circuit is established between the user device and the multimodal platform and said voice circuit is placed on hold as a result of a call waiting.

5. The system of claim 3, wherein the user device is a wireless device and said wireless device is connected to the multimodal platform through a wireless network switch.

6. The system of claim 3, wherein the user device is connected to the multimodal platform via a dedicated data channel.

7. The system of claim 3, wherein the interactive application is a software application that engages in an interaction with a user in possession of the user device.

8. A system for communicating between an application and a caller who are connected by way of a voice circuit in a telecommunications network, wherein the application directly or indirectly delivers audio information to the caller by way of the voice circuit and receives audio information from the caller by way of the voice circuit, the system comprising:

executable programming that receives an indication that the voice circuit has been placed on hold by the caller, and that takes at least one action by the application in response to said indication, without ending a call between the application and the callers;

wherein said application is in a state of waiting for audio information from the caller pending a timeout, and wherein said action comprises extending said timeout; and wherein said caller communicates with said application by way of a telecommunications device that comprises a speaker which renders audio information received by way of the voice circuit, a microphone which captures audio for transmission over the voice circuit, and a visual display, and wherein said action comprises:

suspending delivery of audio information to the caller; and delivering data renderable on said visual display which corresponds to the audio information whose delivery has been suspended.

9. A method for communicating between an interactive application and a user device, wherein said interactive application is an application that engages in an interactive session with said user device, said method comprising:

hosting said interactive application on a multimodal platform, wherein said multimodal platform enables communication in a plurality of modes between the interactive application and the user device, and wherein the interactive application can switch between the modes;

receiving an indication from the user device that communication between the user device and interactive application has been put on hold;

maintaining a state of the interactive application during the time that the communication in the first mode is put on hold; and, extending the timeout of the connection between the user device and the interactive application while said communication has been put on hold.

10. The method of claim 9 wherein the modes comprise an audio mode and a visual mode.

* * * * *